Patented Nov. 28, 1922.

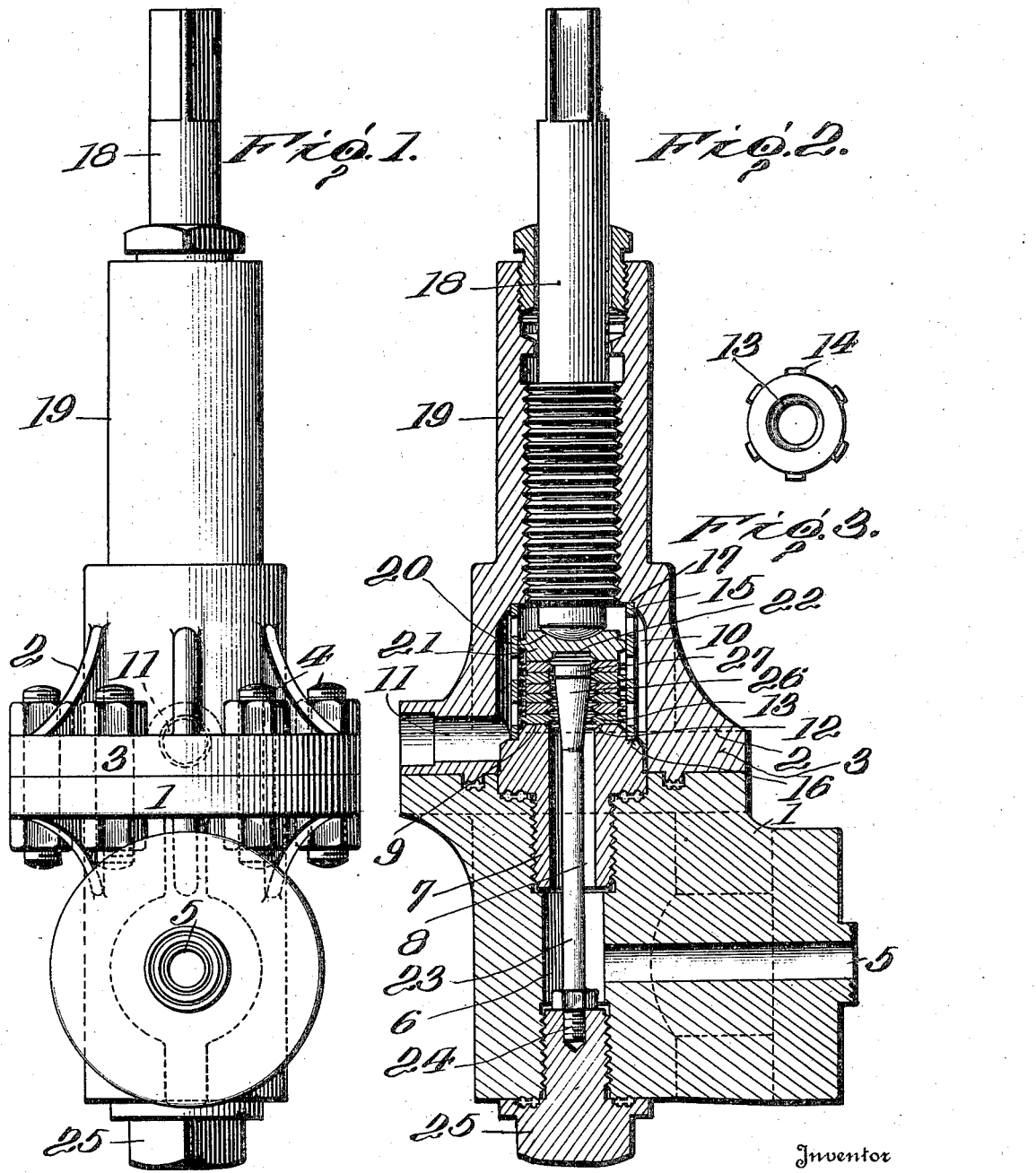

1,436,947

UNITED STATES PATENT OFFICE.

SCOTT J. DAVIS, OF OKLAHOMA, OKLAHOMA, ASSIGNOR TO E. F. COMEZYS, OF OKLAHOMA, OKLAHOMA.

PROCESS FOR PRESERVING LACTEAL FLUIDS.

Application filed October 26, 1922. Serial No. 597,042.

*To all whom it may concern:*

Be it known that I, SCOTT J. DAVIS, a citizen of the United States, residing at Oklahoma, in the county of Oklahoma, State of Oklahoma, have invented certain new and useful Improvements in Processes for Preserving Lacteal Fluids, of which the following is a description, reference being had to the accompanying drawing and to the figures of reference marked thereon.

This invention relates to the preservation of lacteal fluid, and more particularly to a process by which ordinary raw cow's or goat's milk may be kept indefinitely without adding anything to, or taking anything away from, or in any way changing the food value or chemical properties of the milk.

I am aware that there are a number of processes patented by which it is claimed milk can be kept indefinitely, but to my knowledge none have been able to do so, without adding a preservative of some kind, or adding other substances such as milk sugar, lime water, bicarbonate of soda, water, butter-fat, casein or cane sugar in order to make the milk marketable and keep; or without injuring the flavor, taste, odor, color and chemical properties of the milk. Up to the present time no process has been invented that has been able to absolutely guarantee that the milk product will keep indefinitely and still have a marketable milk product. The difficulties all other processes have had are these:—First, after the milk has been allowed to stand in the container a week or two, the butter-fat separates out, comes to the top and forms in hard balls of churned butter-fat which makes the milk objectionable and unmarketable. Second, when the milk is heated, the casein separates out of the milk and has the appearance of sour, curdled milk. Third, the milk when sterilized is subjected to such temperature and conditions that the milk sugar of the milk caramelizes and turns brown, making the milk objectionable and unmarketable. Fourth, the milk when sterilized is subjected to such temperatures and conditions that the flavor of the milk is injured and it takes on a burned or bitter taste or flavor which makes the milk objectionable for human consumption and unmarketable. Fifth, I believe the principal objection to other processes and inventions is that they all must add foreign substances to the milk, such as lime water, bicarbonate of soda, milk sugar, water, butter-fat, casein or cane sugar to make the milk keep and as it is strictly against and in violation of all State and Federal laws to add any substance to milk for human consumption, all these processes are of no value and not commercially possible, practical or marketable.

One of the main objects of the present invention is to provide a process which will absolutely guarantee that the milk product so processed will keep indefinitely, without adding anything to or taking anything from and will be thoroughly practical and commercially successful and marketable.

Another object of the present invention resides in a process wherein the milk is given a definite heat treatment, preparatory to the homogenizing operation, to attain a complete and permanent comminution of the butter-fat globules followed by a sterilizing treatment to thereby most efficiently and permanently preserve the milk.

Still a further object of this invention resides in subjecting the raw milk to successive treatments, in which each individual treatment has substantially well defined limits all as hereinafter set forth.

These and other objects will appear manifest from a perusal of the following specification, and also from the drawings, wherein—

Figure 1 is an elevation of a preferred form of homogenizer used in the process;

Fig. 2 is a sectional view thereof taken at right angles thereto, and

Fig. 3 is a plan view of one of the homogenizing disks.

According to my process, the milk as it is received is tested with care. It must be good, pure milk of good quality and must contain not more than .18 of one per cent of acid. The milk is then freed of any foreign matter or impurities by a process of filtration which is carried out by centrifugal force.

The milk is then run into any container or receptacle and quickly heated to approximately 180° F. to 185° F. which maximum temperature is maintained for substantially one minute only. This complete heating period including the one minute maximum heat should not extend over substantially thirty minutes. There are four reasons for this initial heating step. First, to drive out all foul odors and gases the milk may contain. Second, to thoroughly mix all the elements of the milk, such as the butter-fat, throughout the milk serum. Third, to so thoroughly heat the butter-fat, albumen, casein and milk sugar in the milk so they will not change in chemical qualities or separate out in the process of sterilizing due to the high heat employed in the sterilizer. Fourth, to so thoroughly break up all the clusters of butter-fat globules and destroy the cream line of the milk so that the homogenizer has a good and fair chance to break up each individual butter-fat globule and thereby prevent the butter-fat from afterward separating out and causing large lumps of butter-fat to collect on the top of the milk which would render it objectionable and unmarketable.

After heating the milk for approximately one minute at this maximum temperature of 180° F. to 185° F. as outlined above, the milk is immediately cooled to approximately 150° F., at which temperature it is homogenized at a pressure of substantially three thousand to three thousand, five hundred pounds per square inch. I am aware that homogenization of milk is an old process and widely used, but heretofore, no inventor has clearly or specifically stated at what temperature or at what pressure the milk should pass through the homogenizer, hence—there has been a great deal of trouble with the product due to the fact that unless the correct temperature and pressure is used, the resulting product will not be efficiently homogenized and the butter-fat will separate out, causing hard lumps on the surface of the milk, rendering it objectionable and not successful commercially or marketable. Using a temperature of substantially 150° F. and a pressure of substantially three thousand to three thousand, five hundred pounds per square inch on the milk as it passes through the homogenizer, I get a complete and efficient breaking down of the butter-fat globules so that the butter-fat will never separate out no matter how long the milk may stand in its container. This mode of homogenization also renders the milk passing through it at least fifty per cent more digestible and assimilable, particularly for infants or invalids.

While homogenization may be carried out at the above mentioned temperature and pressure, with any suitable commercial homogenizer, the best results are secured, and I prefer to use the homogenizing valve disclosed and claimed in the application of D. F. Hormann, Serial No. 566,430, filed June 6, 1922, the structure of which is disclosed in the drawings. This improved type of valve is particularly effective in that it assures the practically complete and uniform dissemination and disintegration of the fat globules and other constituents of the milk, irrespective of the quantity of milk flowing therethrough.

Referring now specifically to the drawings, the improved valve comprises a casing including a lower section 1 and an upper section 2. These sections are joined along the intermediate line 3, and are bolted together by a series of bolts 4, thereby providing a valve easily disassembled for cleaning purposes if desired. The lower section is provided with a liquid entrance 5 which extends transversely through one side thereof and terminates in a substantially vertical bore 6, the upper face of which is somewhat enlarged to receive a threaded plug 7 having a central milk passage 8 which constitutes a continuation of the passage 6. The upper face of this threaded plug 7 is suitably ground to provide a valve seat 9. The upper portion 2 of the valve casing is provided with an enlarged chamber 10 which surrounds the uppermost portion of the plug 7 and valve seat 9. This chamber 10 is of relatively large dimensions to accommodate the stack or column of homogenizing disks which are superimposed upon the valve seat 9. At one side, the chamber 10 emerges into a milk discharging outlet 11 which passes through the lower side of the portion 2 of the casing.

The homogenizing disks are preferably arranged as annuli, the central openings of which register and are concentric with the milk passage 8 of the threaded plug 7. These annuli are preferably beveled on their inner faces as is customary in the art to provide an easy ingress of the milk between the ground flat surfaces of the annuli. Preferably the inner wall of each of these annuli of disks are beveled toward the flat face as at 12 and 13. On the upper circumference or periphery, each annuli is provided with a series of radial lugs 14 preferably sixty degrees apart. These lugs constitute spacing members for a perforated centering sleeve 15 which is clamped between the shoulder 16 on the upper face of the plug 7 and a shoulder 17 on the inner upper wall of the chamber 10. The inner wall of this centering sleeve fits exactly the outer peripheral faces of the lugs 14 so that when the disks are in position, the centering sleeve maintains them concentrically about the central milk passage 8. As shown, this sleeve is suitably perforated to permit the passage of the milk discharging therethrough. In addition, these perforations more thoroughly break up and emulsify the milk as it discharges therethrough.

The homogenizing disks are clamped together and to the seat 9 by means of a valve stem 18. This valve stem threads through an upper elongated sleeve 19 which is a part of the upper portion 2 of the valve casing. The lower portion of this valve stem 18 is provided with a rounded ball-like surface 20 which fits within a concavity in the top of the upper valve disk 21 which is preferably much thicker than the other valve disk and of course, has no opening therethrough, the same being slightly recessed as at 22 to permit a sufficient passage of milk to the joint between these disks and the lower adjacent valve disk. This ball joint between the stem 18 and the upper disk gives an automatic adjustment of the valve disk so that there can be no irregular openings between the disks, even if the same are not as thick on one side as they are on the other, provided that the faces of the disks are true and straight. So also, this universal or ball joint allows for any inaccuracy in the valve such as the center line of the valve stem or the threaded plug 7 not being exactly in line or parallel with the center line of the valve, or for instance, if the face of the threaded plug 7 is not exactly at right angles with the center line of the valve stem, which may be caused by inaccurate machining of the different parts of the valve. Obviously, this ball joint may be formed by inserting a round ball between the cup-shaped faces formed in the lower end of the valve stem 18 and the upper face of the top disk.

Means is provided for causing the liquid or milk to flow between all of the homogenizing disks. The preferred form of this means comprises the distributing or pressure pin 23 detachably carried as by means of a threaded connection 24 to a threaded plug 25 screwing into an extension of the liquid channel 6. This plug 25 not only closes the end of the bore 6, but also constitutes a means for adjusting the pressure pin relatively to the homogenizing disks. This pressure pin as illustrated extends longitudinally and centrally of the milk channel 6 and its inner end is provided with an enlarged tapered portion 26, the taper flaring gradually outward toward the upper end of the pin to a substantial shoulder 27, at which point the pin is of uniform diameter to the very end. The taper of this pin is so proportioned as to permit only such volume of milk or other liquid to flow between it and the inner projections of the annuli as can be accommodated by and efficiently homogenized between any two adjacent disks. If this pressure pin were not present, all of the milk or liquid to be unified would pass between the two uppermost disks irrespective of the quantity of liquid or milk going through the valve, but with the pressure pin 23 properly adjusted, the space between the pin and the inside edge of the next to the uppermost disk is restricted to such an extent as to allow only enough milk to get to the upper joint between the uppermost disk and the next adjacent disk which this joint will properly homogenize. Now, if more liquid or milk is pumped through the inlet 5 of the valve than this upper joint will perfectly homogenize, the pressure will be greater on the joint immediately below this, that is, the joint between the second and third disks, counting from the top downwardly, than on the upper joint before described, thus causing an increase of the gauge pressure of the pump. Then, if the valve stem 18 is adjusted, that is, slightly opened to give the proper working pressure, the second joint of the valve will open owing to the fact that all the milk or liquid pumped cannot pass the upper end of the pressure pin, and since the pressure and quantity of milk or liquid to be homogenized is increased, and the valve stem has been properly opened to give the corresponding correct working pressure, this second joint will efficiently homogenize the excess amount of fluid which cannot get through the uppermost joint but will flow through the next to the uppermost joint. Thus, by suitably adjusting the valve stem in accordance with the pump pressure and amount of fluid passing through the valve, each disk will open in turn until the full capacity of the valve is reached. From this it is evident that the valve can be operated at variable capacity and that the milk passing through the inlet passage 6 and coming in contact with the inside of the disks and the tapered portion of the pressure pin 23, is evenly distributed in a uniform manner to all of the disked openings.

It must be manifest that the above described device provides a valve which not only is capable of working at a variable capacity, but whenever so working it homogenizes the whole percentage of the milk passing therethrough. The valve as constructed and arranged also thoroughly insures the correct seating of the disks and their correct alinement with respect to the valve stem and pressure pin, the first, by means of the perforated sleeve 15, and the second, by means of the ball joint 19. It will also be evident that in the present valve, the upper portion 19 which may be called the bonnet or collecting dome, may be readily removed to facilitate the cleaning of the apparatus and for removing the homogenizing elements including the lower threaded plug or seat 7, as for instance, when it is necessary to remove these elements to regrind the same or for regrinding the seat. It is further manifest that the pressure pin is entirely independent of the homogenizing disks or annuli, and therefore, these elements can be disassembled without any danger of sticking.

The next step in my process is to immediately cool the milk to fifty degrees (50°) F. as it comes from the homogenizer after which it is placed in clean bottles and sealed airtight with a crown seal, or placed in tin cans which are soldered and sealed airtight.

The airtight sealed bottles, cans, or other containers are now placed in a sterilizer where the milk is sterilized by steam pressure. The sterilizer is constructed and arranged so that the containers of milk are revolved around and oscillated from side to side at the same time; thereby heating each individual container uniformly and efficiently, one container receiving exactly the same amount of heat as another. When the sterilizer is filled with as many containers as it is wished to sterilize, the mechanism is set in motion, the door closed and sealed and the steam turned on. The temperature within the sterilizer is raised as rapidly as possible to a temperature of substantially 230° F. and held there for substantially ten minutes, during the summer months, and raised to substantially 230° F. and held for substantially five minutes during the winter months. The temperature should be raised as rapidly as possible; said operation should not take over twenty minutes. After raising it to the temperature and held for the time stated above, the temperature is reduced as rapidly as possible to at least 50° F. or 60° F. which completes the process and the milk product is ready for market and is a sterile, uniform, practical and marketable product, which has no objectionable odor, taste, or flavor, is not burned, cooked or overheated, has no brown or dark color, has no separation of its elements and will keep indefinitely until the seals of the containers are opened and is a product which by two years of thorough trial in a commercial plant has been found to be successful commercially and practical in every way. It is a milk product which will keep indefinitely, to which nothing has been added or nothing taken away from, and will, therefore, comply with all State and Federal laws and regulations as regards a pure cow's or goat's milk intended for human consumption. No milk product heretofore invented or patented will meet these requirements.

The present application is a continuation in part of an application filed by me February 11, 1922, Serial No. 535,964.

It is distinctly understood that this invention is subject to some degree of latitude, particularly when reference to the specific limitations as to pressure, temperature, and time are concerned, provided such limitations are within the scope of the appended claims as interpreted by the prior art.

Having thus described the invention, what I claim as new and desire to secure by Letters-Patent, is—

1. The process of preserving milk which comprises rapidly raising the temperature of the milk to approximately 182° F., maintaining this temperature for substantially one minute, and simultaneously agitating the milk during the heating period, homogenizing and sterilizing.

2. The process of preserving milk which comprises simultaneously agitating and heating the milk to substantially 180° to 185° F., homogenizing at substantially 150° F., and at a pressure ranging from substantially three thousand to three thousand, five hundred pounds and sterilizing.

3. The process of preserving milk which comprises simultaneously agitating and heating it to substantially 180° F. to 185° F., immediately cooling it to substantially 150° F., and homogenizing at such temperature and at a pressure substantially three thousand to three thousand, five hundred pounds, sealing in containers and sterilizing.

4. The process of preserving milk which comprises simultaneously agitating and heating the milk to substantially 180° to 185° F., homogenizing at substantially 150° F., and at a pressure ranging from three thousand to three thousand, five hundred pounds, cooling to substantially 50° to 60° F., sealing in containers and sterilizing.

5. The process of preserving milk which comprises simultaneously agitating and heating the milk to substantially 180° to 185° F., homogenizing at substantially 150° F. and at a pressure ranging substantially from three thousand to three thousand, five hundred pounds, cooling to substantially 50° F., and rapidly raising the temperature to substantially 230° F., maintaining it at such temperature for substantially five to ten minutes to sterilize.

In testimony whereof, I affix my signature.

SCOTT J. DAVIS.